United States Patent
Abe (10) Patent No.: US 8,992,061 B2
(45) Date of Patent: Mar. 31, 2015

(54) VEHICLE HEADLAMP

(75) Inventor: Toshiya Abe, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 301 days.

(21) Appl. No.: 13/356,016

(22) Filed: Jan. 23, 2012

(65) Prior Publication Data
US 2012/0188784 A1    Jul. 26, 2012

(30) Foreign Application Priority Data

Jan. 26, 2011 (JP) .................. 2011-014537

(51) Int. Cl.
- F21V 19/02 (2006.01)
- F21V 21/14 (2006.01)
- B60Q 1/076 (2006.01)

(52) U.S. Cl.
CPC ............ *B60Q 1/076* (2013.01); *B60Q 2200/32* (2013.01)
USPC ............ 362/528; 362/523; 362/467; 362/513

(58) Field of Classification Search
CPC ....................................................... B60Q 1/00
USPC ......... 362/528, 523, 467, 513, 465, 508, 512, 362/522
See application file for complete search history.

(56) References Cited

U.S. PATENT DOCUMENTS

| 7,621,663 | B2 | 11/2009 | Tajima et al. |
| 7,658,522 | B2 | 2/2010 | Kuwahara et al. |
| 8,007,151 | B2 | 8/2011 | Tajima |
| 8,096,687 | B2 | 1/2012 | Tajima |
| 2005/0213339 | A1 | 9/2005 | Takiguchi et al. |
| 2008/0089086 | A1* | 4/2008 | Tajima et al. ................. 362/524 |
| 2008/0225543 | A1 | 9/2008 | Kuwahara et al. |
| 2010/0110708 | A1 | 5/2010 | Lyons et al. |
| 2010/0110709 | A1 | 5/2010 | Tajima |
| 2010/0110713 | A1 | 5/2010 | Tajima |
| 2011/0188258 | A1 | 8/2011 | Tajima |

FOREIGN PATENT DOCUMENTS

| EP | 1 342 618 B1 | 9/2003 |
| EP | 1 920 972 A2 | 5/2008 |
| EP | 2 163 427 B1 | 3/2010 |
| FR | 2 906 771 A1 | 4/2008 |
| JP | 2002-292440 A | 10/2002 |

(Continued)

OTHER PUBLICATIONS

T. Abe, U.S. PTO Office Action, U.S. Appl. No. 13/356,007, dated May 21, 2013, 9 pages.

(Continued)

*Primary Examiner* — Anh Mai
*Assistant Examiner* — Jessica M Apenteng
(74) *Attorney, Agent, or Firm* — Foley & Lardner LLP (57) ABSTRACT

A vehicle headlamp includes: a lamp unit including an upper support shaft and a lower support shaft that are coaxially formed each other; a bracket adapted to support the lamp unit via a ball bearing in the upper support shaft and via a slider in a lower shaft support portion; an actuator including a mechanism portion adapted to drive the lower support shaft of the lamp unit, the actuator being movable in a forward and backward direction with respect to the bracket; and a spring portion that is fixed to the bracket, and is adapted to compress a tip end of the upper support shaft.

5 Claims, 6 Drawing Sheets

(56) References Cited

FOREIGN PATENT DOCUMENTS

| | | | |
|---|---|---|---|
| JP | 2009-026597 A | 2/2009 | |
| JP | 2010-049861 A | 3/2010 | |
| JP | 2010-049862 A | 3/2010 | |
| JP | 2010-067554 A | 3/2010 | |
| JP | 2010-108867 A | 5/2010 | |
| JP | 2010-108869 A | 5/2010 | |
| JP | 2011-238408 A | 11/2011 | |

OTHER PUBLICATIONS

U.S. Appl. No. 13/356,007, filed Jan. 23, 2012, Abe.
Office Action received in U.S. Appl. No. 13/356,007, dated Aug. 23, 2013.

* cited by examiner

VEHICLE HEADLAMP

CROSS REFERENCE TO RELATED APPLICATIONS

This application claims priority of Japanese Patent Application No. 2011-014537 filed on Jan. 26, 2011. The contents of this application are incorporated herein by reference in their entirety.

BACKGROUND OF THE INVENTION

1. Field of the Invention

The present invention relates to a vehicle headlamp, and in particular, to an AFS (Adaptive Front-lighting System) type vehicle headlamp adapted to faithfully change a light illumination direction in accordance with a travelling state of a vehicle.

2. Description of the Related Art

As a vehicle headlamp of such type, for example, as disclosed in Japanese Unexampled Patent Application Publication No. 2010-108867, there is known the one that is configured in such a manner that: a lamp unit incorporating a light source is pivotably supported on a bracket via support shafts that are embedded in a perpendicular direction of the lamp unit; and among the support shafts, a lower side support shaft (hereinafter, referred to as a lower support shaft) is coupled to an actuator.

In addition, the lower support shaft of the lamp unit is configured to be engaged with an output shaft of a swivel motor in the actuator, and the lamp unit is turned in a transverse direction around the support shaft by means of drive of the swivel motor so that a so called swivel operation is made.

Further, among the support shafts of the lamp unit, a support shaft to be embedded on an opposite side of the actuator (hereinafter, referred to as an upper support shaft) is pivotably supported on the bracket via a ball bearing, enabling the actuator to be slid in a forward/backward direction with respect to the bracket by means of drive of a leveling motor in the actuator. In this manner, the lamp unit is turned in a vertical direction around the ball bearing so that a so called leveling operation is made.

Furthermore, as a vehicle headlamp made of such constituent elements, for example, as disclosed in Japanese Unexamined Patent Application Publication No. 2010-049862, there is known the one that is configured in such a manner that a spring member is fixed to a bracket, and by means of the spring member, a tip end of an upper support shaft of a lamp unit is compressed so as to allow the upper support shaft to generate a biasing force along an axial direction of the support shaft. In this manner, the lamp unit is biased to a lower side on which an actuator is to be disposed to thereby preclude a so called backlash from being generated between the lamp unit and the bracket or the actuator.

In such a case, the tip end of the upper support shaft, which abuts against the spring member, slides with the spring member at the time of turning in a vertical direction (leveling operation) of the lamp unit, and is configured as a semispherical face having a radius that is substantially identical to that of the upper support shaft in order to smoothen the sliding.

However, in the vehicle headlamp that is configured as described above, it has been found out that sliding of the actuator in a forward/backward direction with respect to the bracket is not sufficiently smooth in leveling operation of the lamp unit.

As a result of studying a cause of such problem, the inventor et al. found the fact that: the spring member is reciprocally moved in a vertical direction due to a swinging movement of the upper support shaft around a ball bearing; a distortion occurs in compression of the spring member in an axial direction of the upper support shaft; and in turn, a distortion occurs in a load that is applied to a sliding portion of the actuator and then the distortion in this load precludes smooth sliding of the actuator in the forward/backward direction with respect to the bracket.

The present invention has been made in view of such a circumstance, and it is an object of the present invention to provide a vehicle headlamp that is capable of smoothing sliding of the actuator in the forward/backward direction with respect to the bracket in leveling operation of the lamp unit.

SUMMARY OF THE INVENTION

According to the vehicle headlamp of the present invention, a radius of a spherical face of a tip end, which abuts against a spring member, of an upper support shaft of a lamp unit is made different from a conventional one, thereby eliminating reciprocate movement in a vertical direction of the spring member so as to thereby substantially stabilize a load that is applied to a sliding portion of an actuator.

A vehicle headlamp according to the present invention is configured as follows.

(1) A vehicle headlamp includes a lamp unit that incorporates a light source and includes an upper support shaft and a lower support shaft that are coaxially formed each other; a bracket adapted to support the lamp unit via a ball bearing in the upper support shaft and via a slider in the lower shaft support portion; an actuator including a mechanism portion adapted to drive the lower support shaft of the lamp unit, the actuator being movable in a forward and backward direction with respect to the bracket; and a spring portion that is fixed to the bracket, and is adapted to compress a tip end of the upper support shaft, in which the actuator is configured to turn the lamp unit in a vertical direction around the ball bearing by means of being movable in the forward and backward direction, so that the slider slides with respect to a fixing portion of the bracket at a same time; a sliding portion between the slider and the fixing portion of the bracket is configured as an arc-shaped face having a curvature that is made of a radius around the ball bearing; and a tip end to be compressed by the spring portion of the upper support shaft is configured as a spherical face having a curvature that is made of a radius around the ball bearing.

(2) In the vehicle headlamp according to the configuration (1), the ball bearing is supported with the bracket by means of a bearing holder, and the bearing holder is configured integrally with the spring portion.

(3) In the vehicle headlamp according to the configuration (2), the bearing holder is formed integrally with the fixing portion for the bracket, a bearing holding portion adapted to hold the ball bearing, and the spring portion adapted to compress the tip end of the upper support shaft; the fixing portion includes the bearing holding portion adapted to hold the ball bearing on a flat plate member while a center of the ball bearing is positioned and held in a plane that includes the flat plate member; the fixing portion is provided with an elongated hole that is adjacent to the bearing holding portion and that extends in a direction crossing the upper support shaft; the tip end of the upper support shaft to be inserted into the bearing is configured so as to be positioned in the elongated hole; the spring portion includes a first extension portion that is extended after bent with respect to the flat plate member from the fixing portion, a curved portion, and a second extension portion that is further extended so as to be loosely engaged into the elongated hole of the fixing portion; and the second extension potion is loosely engaged into the elongated hole in a direction that is substantially orthogonal to a direction of the flat plate member of the fixing portion, and is configured so as to compress the tip end of the upper support shaft.

The vehicle headlamp that is made of such constituent elements is capable of smoothening sliding of the actuator in the forward/backward direction with respect to the bracket in leveling operation of the lamp unit.

BRIEF DESCRIPTION OF THE DRAWINGS

FIG. 1 (a) and FIG. 1 (b) are sectional views each showing a bearing holder that is fixed to a bracket of a vehicle headlamp of the present invention together with an upper support shaft, wherein FIG. 1 (a) is a view showing a case in which the upper support shaft is oriented in a perpendicular direction, and FIG. 1 (b) is a view showing a case in which the upper support shaft is slightly inclined with respect to the perpendicular direction.

FIG. 2 (a) and FIG. 2 (b) are structural views of the vehicle headlamp of the present invention, wherein FIG. 2 (a) is a perspective view of the vehicle headlamp, and FIG. 2 (b) is a perspective view when the vehicle headlamp shown in FIG. 2 (a) is dissembled.

FIG. 4 (a) and FIG. 4 (b) are structural views of a bearing holder that is included in the vehicle headlamp of the present invention, wherein FIG. 4 (a) is a perspective view of the bearing holder, and FIG. 4 (b) is a sectional view taken along the line b-b of FIG. 4 (a).

FIG. 5 (a) and FIG. 5 (b) are sectional views of the vehicle headlamp of the present invention, which is taken along the face including the upper support shaft and a lower support shaft, wherein FIG. 5 (a) is a view showing a case in which a centerline that is drawn to connect the upper support shaft and the lower support shaft to each other is oriented in a perpendicular direction, and FIG. 5 (b) is a view showing a case in which the centerline that is drawn to connect the upper support shaft and the lower support shaft to each other is slightly inclined with respect to the perpendicular direction.

FIG. 6 (a) and FIG. 6 (b) each show a configuration of a conventional upper support shaft, wherein FIG. 6 (a) is a schematic view which corresponds to FIG. 1 (a), and FIG. 6 (b) is a schematic view which corresponds to FIG. 1 (b).

DESCRIPTION OF THE PREFERRED EMBODIMENTS

Hereinafter, modes for carrying out the present invention (hereinafter, referred to as embodiments) will be described in detail with reference to the accompanying drawings. Throughout the description of the embodiments, like constituent elements are designated by like reference numerals.

(First Embodiment)
<Entire Configuration>

Figure 2A:
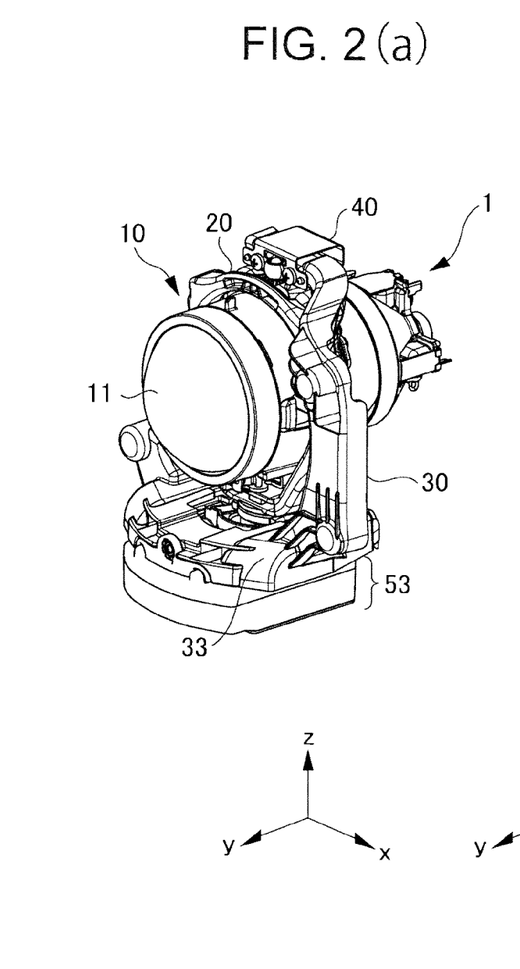
Figure 2B:
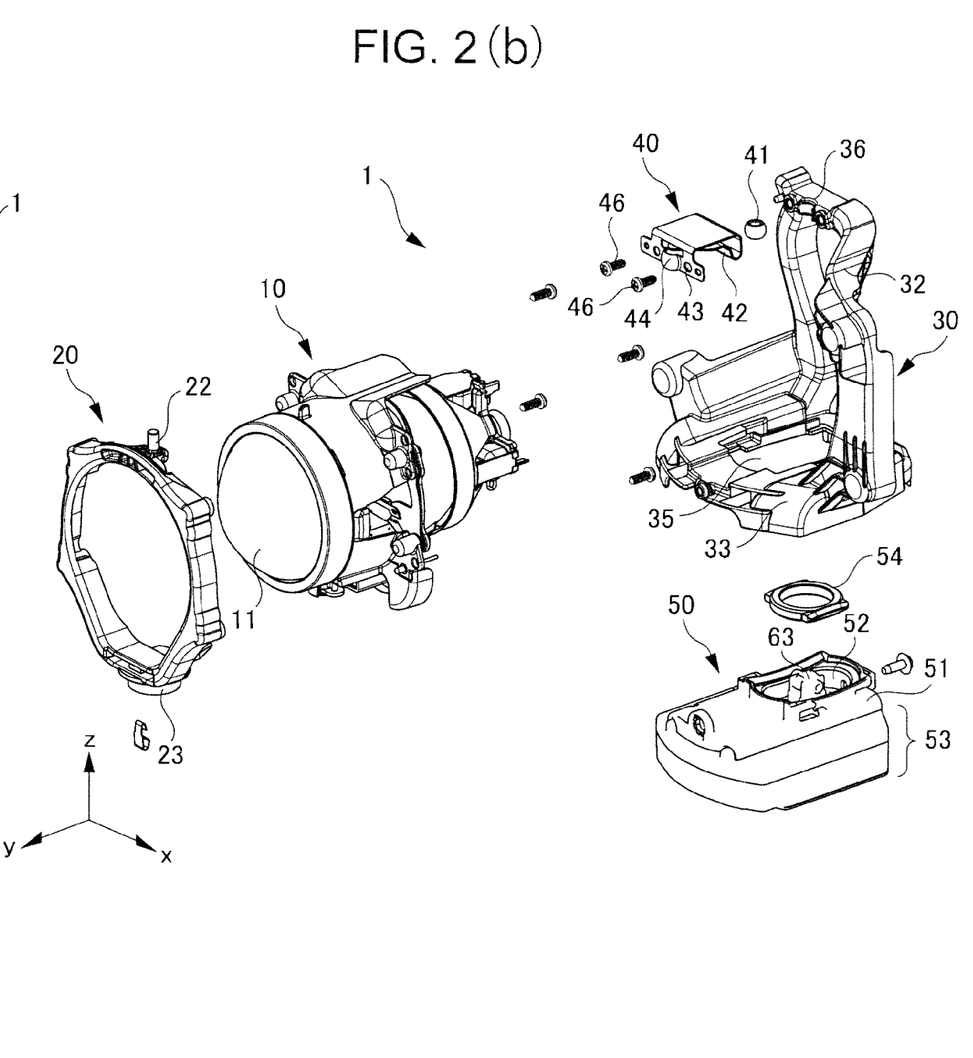

FIG. 2 (a) shows a perspective view of a vehicle headlamp of the present invention, and FIG. 2 (b) shows a perspective view when the vehicle headlamp shown in FIG. 2 (a) is dissembled.

In FIG. 2 (a) and FIG. 2 (b), an x-direction, a y-direction, and a z-direction are defined, and these directions indicated by the arrows respectively correspond to a rightward direction (or a leftward direction as an opposite direction), a forward direction (or a backward direction as an opposite direction), and an upper direction (or a lower direction as an opposite direction).

A vehicle headlamp 1, as shown in FIG. 2 (b), is roughly made of a lamp unit 10, a shaft fixing portion 20, a bracket 30, a bearing holder 40, and an actuator main body 50.

Figure 5A:
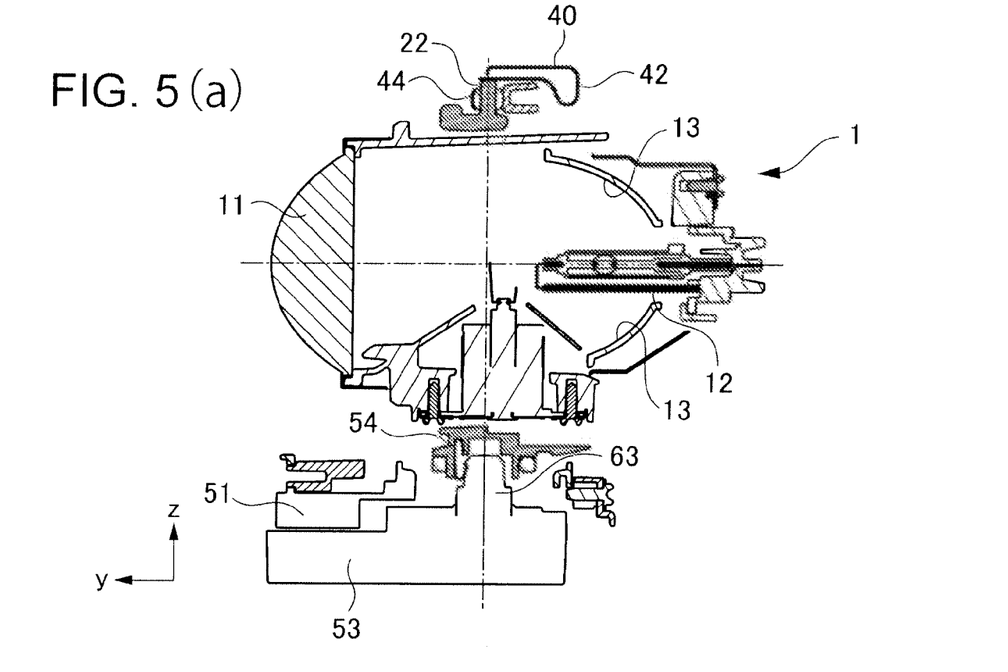
Figure 5B:
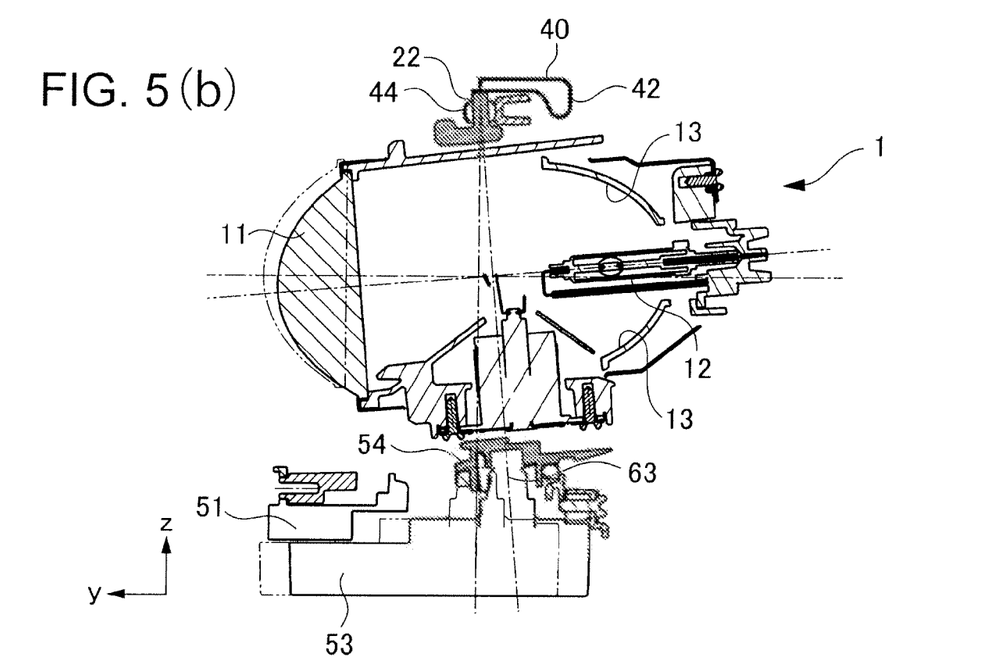

The lamp unit 10 is configured to incorporate a light source (designated by reference numeral 12 in FIG. 5), so that light from the light source is emitted to the outside through a front lens 11. The lamp unit 10 is configured to incorporate a reflector (designated by reference numeral 13 in FIG. 5) so as to surround the light source so as to guide light other than the light that is to be directly emitted to the lens 11, to the lens side by means of the reflector.

The shaft fixing portion 20 is made up of an annular body, is engaged with the lamp unit 10, and is disposed to surround a side face of the lamp unit 10 (refer to FIG. 2 (a)). The shaft fixing portion 20 is provided with an upper support shaft 22 and a lower support shaft 23. The upper support shaft 22 and the lower support shaft 23 are disposed to be coaxial to each other in a vertical direction (z-direction). In this manner, the lamp unit 10 is configured as the one that is provided with the upper support shaft 22 and the lower support shaft 23 by means of the shaft fixing portion 20 that is engaged with the lamp unit 10. From the viewpoint of the foregoing description, the upper support shaft 22 and the lower support shaft 23 are not always formed at the shaft fixing portion 20, and may be configured so as to be directly formed on an outer circumferential face of the lamp unit 10. Therefore, in the following description, the upper support shaft 22 and the lower support shaft 23 may be respectively referred to as an upper support shaft 22 of the lamp unit 10 and a lower support shaft 23 of the lamp unit 10.

The bracket 30 is disposed to surround a side face of the lamp unit 10 while the lamp unit 10 on which the shaft fixing portion 20 is mounted is loosely inserted (loosely engaged). The bracket 30 is configured with a support frame body 32 and a support board portion 33 that is provided at a lower part of the support frame body 32. The support frame body 32 is formed in a substantially reversed U shape in a case where it is seen from the front side, and is disposed to be opposed to a top face and left and right faces of the lamp unit 10. The support board portion 33 is formed in a plate shape that couples an opening end of the support frame body 32, and is disposed to be opposed to a bottom face of the lamp unit 10. It is to be noted that in the support board portion 33, a comparatively large hole 35 is provided through which top and bottom faces of the board portion are to be passed. Through the hole 35, the lower support shaft 23 of the lamp unit 10 is engaged with an output shaft 63 of an actuator 53 to be described later.

At an upper part of the bracket 30 (the support frame body 32), a bearing holder 40 is fixed. This bearing holder 40 is adapted to hold a ball bearing 41 for inserting the upper support shaft 22 of the lamp unit 10 by means of the holder itself and the bracket 30. The ball bearing 41 is capable of being arbitrarily rotated while the bearing is held at a predetermined position between the bearing holder 40 and the bracket 30. The bearing holder 40 is configured with a spring portion 42 adapted to compress in an axial direction a tip end of the upper support shaft 22 of the lamp unit 10, the shaft being inserted into the ball bearing 41. In other words, the bearing holder 40 is formed by means of a press made of a metal plate such as a stainless plate, for example, and is configured integrally with a fixing portion 43 for the bracket 30, a bearing holding portion 44 for the ball bearing 41, and the spring portion 42. In this manner, the bearing holder 40 is configured integrally with the fixing portion 43, the bearing holding portion 44, and the spring portion 42, thereby making it possible to achieve substantial reduction of the number of parts.

It is to be noted that, as described later, the tip end of the upper support shaft 22 of the lamp unit 10 is processed to be spherical in order to smoothen sliding with the spring portion 42 at the time of leveling operation of the lamp unit 10 (refer to FIGS. 1(a) and 1(b)), and is configured to have a curvature with a radius (designated by reference uppercase letter R in FIGS. 1(a) and 1(b)) around the ball bearing 41 (designated by reference uppercase letter O in FIGS. 1(a) and 1(b)). As described later, such a shape of the tip end of the upper support shaft 22 is capable of significantly restraining a variation in the vertical direction of the spring portion 42. A detailed description of the bearing holder 40 will be further given later.

In the support board portion 33 of the bracket 30, the actuator main body 50 is mounted on a lower side of the board portion. The actuator main body 50, as described later in detail, has: a bracket fixing portion 51 to be directly fixed to the support board portion 33 of the bracket 30; and a mechanism housing portion (to be occasionally referred to as an actuator) 53 that is movable in a forward/backward direction with respect to the bracket portion 51.

Figure 3:
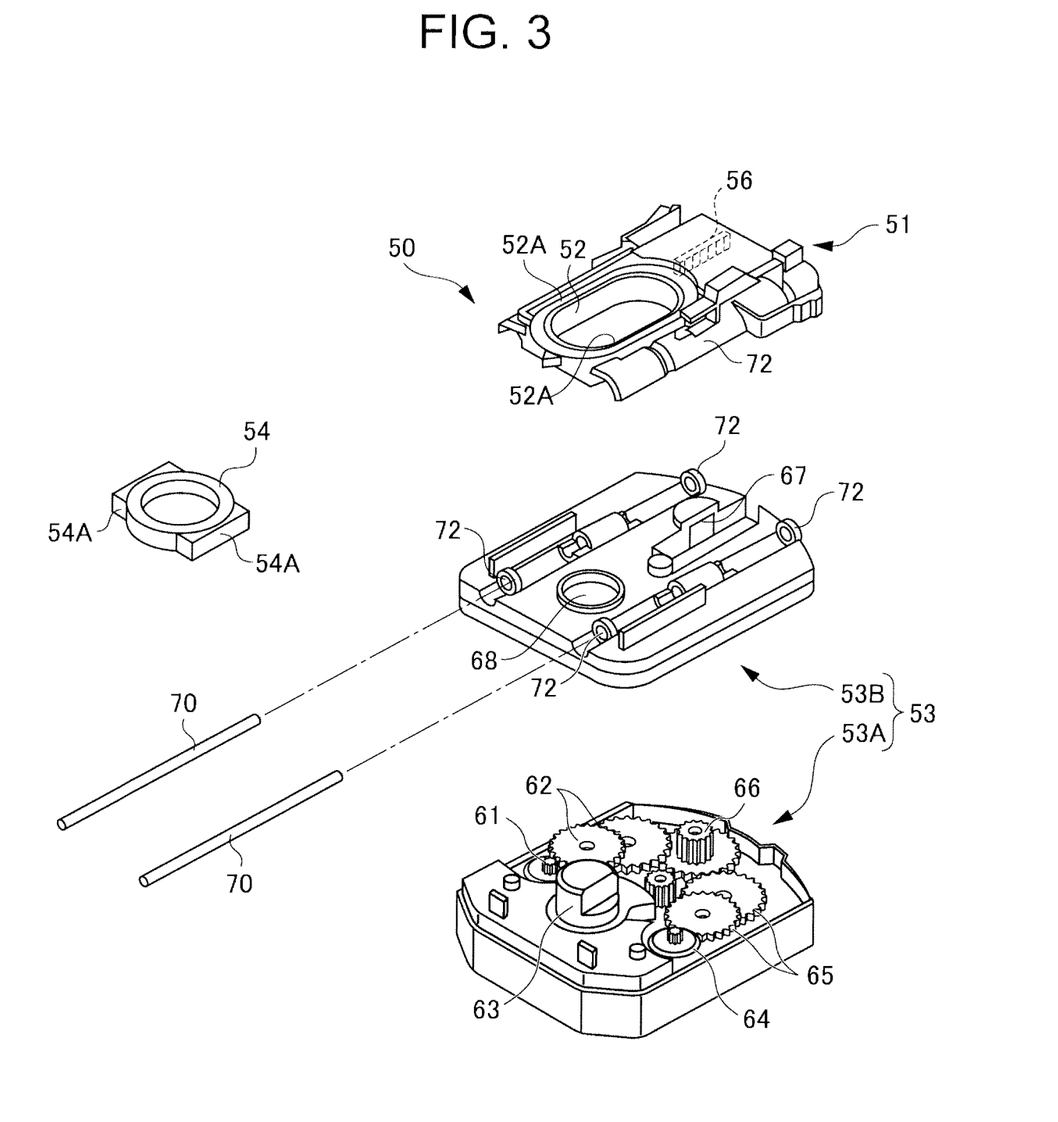
FIG. 3 is a perspective view seen when an actuator main body that is included in the vehicle headlamp of the present invention is dissembled.

In the bracket fixing portion 51, a hole 52 is provided through which top and bottom faces of the fixing portion are to be passed, and through this hole 52, the lower support shaft 23 of the lamp unit 10 is engaged with the output shaft 63 via a gear train of a swivel motor (which is not shown and is designated by reference numeral 64 in FIG. 3) that is disposed in the mechanism housing portion 53. The lower support shaft 23 of the lamp unit 10 is turned around the lower support shaft 23 by means of drive of a swivel motor 64 so that a swivel operation for the lamp unit 10 to turn in a transverse direction around the upper support shaft 22 and the lower support shaft 23 is made.

In addition, the mechanism housing portion 53 is provided with a leveling motor (which is not shown and is designated by reference numeral 61 in FIG. 3) adapted to move the mechanism housing portion 53 in a forward/backward direction (y-direction) with respect to the bracket fixing portion 51. The mechanism housing portion 53 moves with respect to the bracket fixing portion 51, whereby the lower support shaft 23 of the lamp unit 10 is swung around the ball beating 41 so that a leveling operation for the lamp unit 10 to turn in the vertical direction is made. As described later in detail, a slider 54 that is inserted to be engaged with the lower support shaft 23 of the lamp unit 10 is disposed in the hole 52 of the bracket fixing portion 51. The slider 54 in its left and right terminal edges is abutted against the left and right circumferential edges of the hole 52 of the bracket fixing portion 51 to be able to slide in the forward/backward direction with respect to the bracket fixing portion 51 concurrently with the leveling operation of the lamp unit 10.

(Actuator)

FIG. 3 shows a perspective view when the actuator main body 50 is dissembled. As described above, the actuator main body 50 is made of the bracket fixing portion 51 and the mechanism housing portion (actuator) 53. In addition, the mechanism housing portion 53 is made of a housing base portion 53A and a housing cover portion 53B.

First, the swivel motor 64 is disposed in the housing base portion 53A of the mechanism housing portion 53 so that the swivel motor 64 rotates the output shaft 63 via the gear train 65. The output shaft 63 is erected in a vertical direction so that a tip end of the shaft is engaged with the tip end of the lower support shaft 23 of the lamp unit 10. It is to be noted that the lower support shaft 23 of the lamp unit 10 is engaged with the output shaft 63 through a respective one of the hole 35 of the support board portion 33, the hole 52 of the bracket fixing portion 51, and a hole to be described later, which is formed in the housing cover portion 53A. Engagement between the tip end of the output shaft 63 and the tip end of the lower support shaft 23 is made by means of engagement of a protrusive portion that is formed on one tip end face, for example, with a recessed portion that is formed on the other tip end face.

In addition, the leveling motor 61 is disposed in the housing base portion 53A so that the leveling motor 61 rotates a pinion gear 66 via a gear train 62. The pinion gear 66 is erected in the vertical direction so as to be geared with a rack 56 that is provided on a back face of the bracket fixing portion 51, through a hole 67 that is formed in a housing cover portion 53B. The rack 56 has a number of gear teeth that are arranged in parallel in the forward/backward direction so that the housing base portion 53A (i.e., the mechanism housing portion 53) is capable of moving in the forward/backward direction with respect to the bracket fixing portion 51 (i.e., the bracket 30) by means of rotation of the pinion gear 66 which is to be geared with the rack 56. It is to be noted that electronic circuit parts (not shown) adapted to drive the swivel motor 64 or the leveling motor 61 are mounted on the back face side of the housing base portion 53A.

The housing cover portion 53B of the mechanism housing portion 53 is fixed by means of engagement, for example, with the housing base portion 53A while covering the swivel motor 64, the gear train 65, the output shaft 63, the leveling motor 61, the gear train 62, and the pinion gear 66 or the like that are disposed in the housing base portion 53A. In the housing cover portion 53B, a hole 68 and the hole 67 are formed through which top and bottom faces of the cover portion are to be passed; the hole 68 is provided so that the output shaft 63 is exposed; and the hole 67 is provided so that the pinion gear 66 is geared with the rack 56 that is provided at the bracket fixing portion 51. In addition, the housing cover portion 53B is supported on the bracket fixing portion 51 via a pair of guide shafts 70. In other words, the housing cover portion 53B and the bracket fixing portion 51, in their left and right side portions, respectively have a plurality of shaft hole portions 72 that are arranged in parallel to be spaced from each other in the forward/backward direction. A center shaft of the shaft holes of these shaft hole portions 72 is extended in the forward/backward direction, and is coaxial in a respective one of the left and right sides.

The housing cover portion 53B and the bracket fixing portion 51, in a respective one of the left and right sides, are supported by each other by means of the guide shaft 70 being alternatively inserted into the shaft hole portion 72 of the housing cover portion 53B and the shaft hole portion 72 of the bracket fixing portion 51. In this case, the shaft hole portion 72 of the housing cover portion 53B and the shaft hole portion 72 of the bracket fixing portion 72, which is adjacent to the shaft hole portion 72, are formed to have a gap, and the housing cover portion 53B is configured so as to be movable along a longitudinal direction of the guide shaft 70 with respect to the bracket fixing portion 51. In this manner, the mechanism housing portion (actuator) 53 that is configured to fix the housing base portion 53A to the housing cover portion 53B is configured so as to be movable in the forward/backward direction with respect to the bracket fixing portion 51. Movement in the forward/backward direction with respect to the bracket fixing portion 51 of the mechanism housing portion 53 is made by means of drive of the leveling motor 61.

The bracket fixing portion 51 is fixed to a lower face of the support board portion 33 of the bracket 30, and a hole 52 is provided through which top and bottom faces of the board portion are passed. The lower support shaft 23 of the lamp unit 10 is inserted through the hole 52. This hole 52 is formed in the shape of an elongated hole with its large diameter in the forward/backward direction so that turning in the vertical direction of the light unit is made. In addition, the slider 54 that is inserted to be engaged with the lower support shaft 23 of the lamp unit 10 is disposed in the hole 52. The slider 54, in its left and right terminal edges, is abutted against the left and right circumferential edges of the hole 52 of the bracket fixing portion 51, whereby the lamp unit 10 is supported by means of the bracket fixing portion 51, and the slider 54 is capable of sliding with respect to the bracket fixing portion 51 at the time of turning in the vertical direction of the lamp unit 10.

Therefore, in the slider 54, a sliding piece portion 54A is formed on the left and right terminal edges, and a sliding edge portion 52A to be abutted against the sliding piece portion 54A is formed on the left and right peripheral edges of the hole 52 of the bracket fixing portion 51. In this case, faces to be abutted against each other, between the sliding piece portion 54A and the sliding edge portion 52A, are formed as arc-shaped faces each having a curvature around the ball bearing 41 adapted to pivotably support the upper support shaft 22 of the lamp unit 10. In this manner, smooth sliding of the slider 54 with respect to the bracket fixing portion 51 can be made at the time of turning in the vertical direction of the lamp unit 10. It is to be noted that the shaft hole portion 72 through which the guide shaft 70 is to be inserted is provided at each of the left and right sides in the bracket fixing portion 51, and that the rack 56 is provided in the back face, as described above.

<Bearing Holder>

Figure 4A:
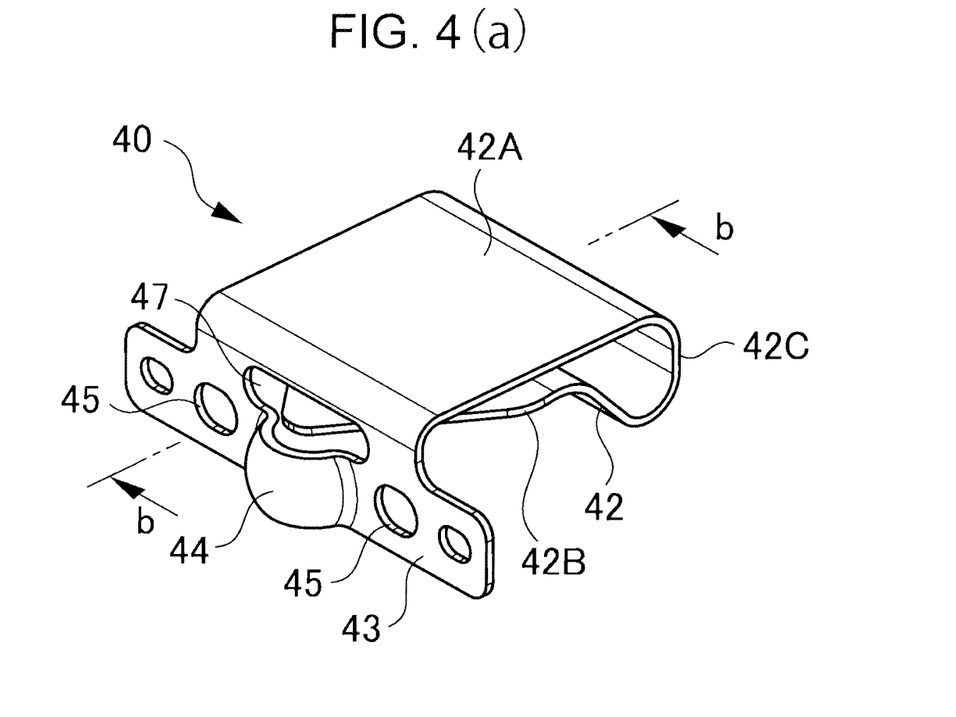
Figure 4B:
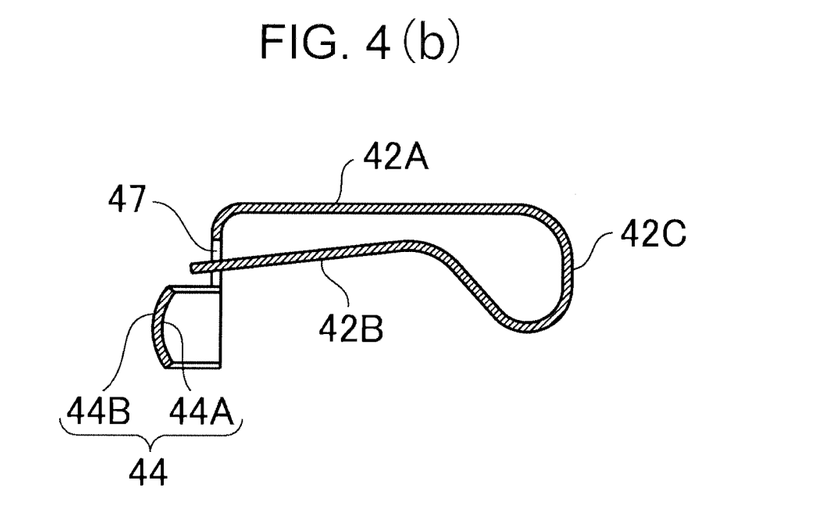

FIG. 4 (*a*) and FIG. 4 (*b*) are views each showing a bearing holder 40, wherein FIG. 1 (*a*) is a perspective view of the bearing holder, and FIG. 1 (*b*) is a sectional view of the bearing holder, which is taken along the line b-b of FIG. 4 (*a*).

The bearing holder 40 is formed by means of a press made of a metal plate such as a stainless plate, and is configured integrally with the fixing portion 43 for the bracket 30, the bearing holding portion 44 for the ball bearing 41, and the spring portion 42.

The fixing portion 43 of the bearing holder 40 is formed as a flat plate portion that extends in the transverse direction while positioning the bearing holding portion 44 at a center of the fixing portion, and is configured in such a manner that a plurality of spiral holes 45 are provided in this flat plate portion. Fixing of the fixing portion 43 to the bracket 30 is made by means of bolts (designated by reference numeral 46 in FIG. 2) to be spirally inserted into the bracket 30 through the respective spiral holes 45.

Figure 1A:
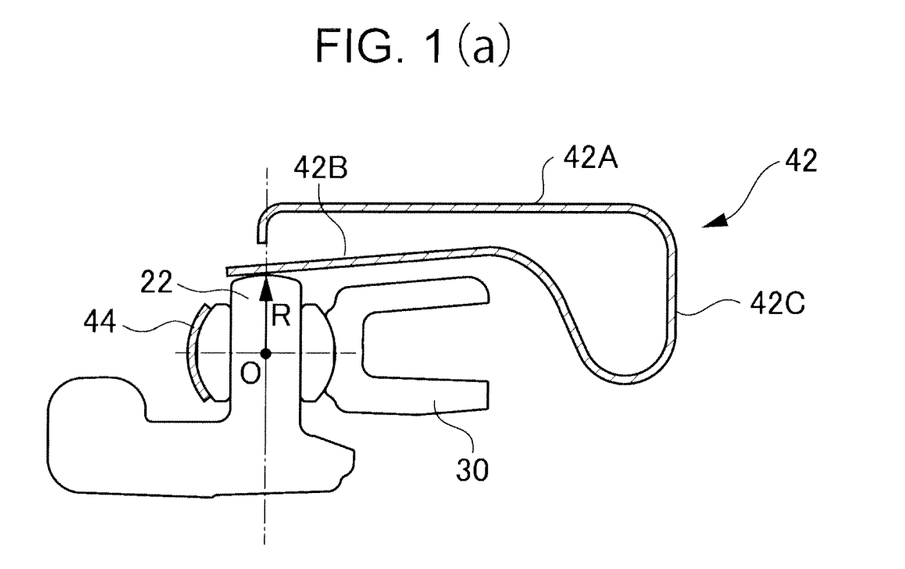
Figure 1B:
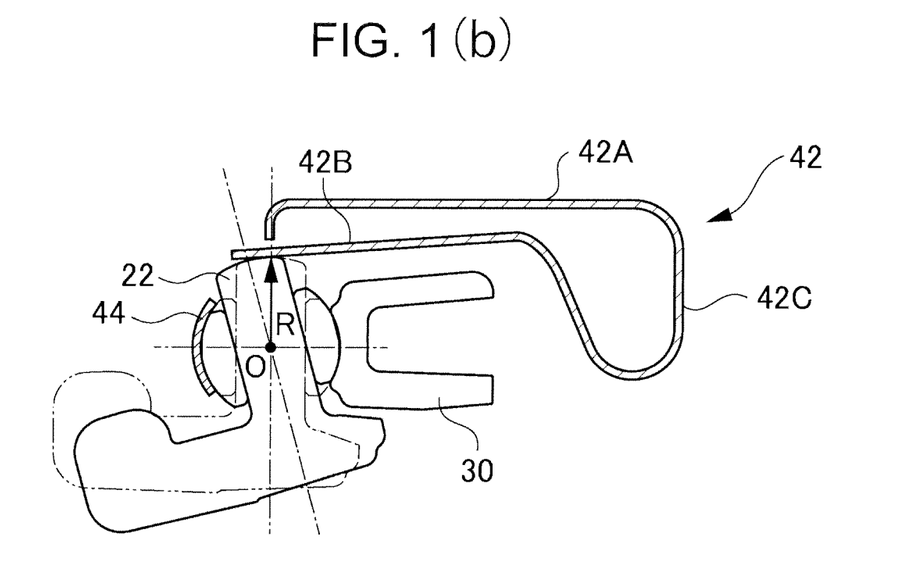

The bearing holding portion 44 is adapted to hold the ball bearing 41 together with the bracket 30, and is configured to have a recessed portion (designated by reference numeral 44A in FIG. 1 (*b*)) that is abutted in opposite to substantially half of the ball bearing 41 in a face on the side of the ball bearing 41 (thereby having a protrusive portion 44B to be reflected by the recessed portion in an opposite face). It is to be noted that, with respect to the bracket 30, in a face on the side of the ball bearing 41, a recessed portion (designated by reference numeral 36) in FIG. 2) that is abutted in opposite to substantially half of the ball bearing 41 is formed.

As described above, the ball bearing 41 can arbitrarily rotate (rotate on its axis) between the recessed portion 44A of the bearing holding portion 44 and the recessed portion 36 of the bracket 30. In this case, a center O of the ball bearing 41 is positioned in a plane that includes the fixing portion 43 of the bearing holder 40 (excluding the bearing holding portion 44) in spite of rotation of the ball bearing 41 (refer to FIGS. 1(*a*) and 1(*b*)).

In addition, at the fixing portion 43, an elongated hole 47 that extends in the transverse direction is formed at an upper side that is adjacent to the bearing holding portion 44. In this manner, a tip end of the upper support shaft 22 to be inserted into the ball bearing 41 is positioned in the elongated hole 47. It is to be noted that a tip end part of the spring portion 42 to be described later is loosely engaged into the elongated hole 47 so as to be slightly protrusive to the front side, and that the tip end side of the spring portion 42 is abutted against the tip end of the upper support shaft 22 so as to compress the upper support shaft 22 in an axial direction of the shaft.

Further, in the bearing holder 40, an upper edge in the fixing portion 43 of the holder is extended after bent so as to be substantially orthogonal to the fixing portion 43 (hereinafter, this extension portion is referred to as a first extension portion 42A). The first extension portion 42A forms a curved portion 42C, and further, is configured to be extended so as to be loosely engaged into the elongated hole 47 of the fixing portion 43 (hereinafter, this extension portion is referred to as a second extension portion 42B). It is to be noted that the bearing holder 40 is fixed to the bracket 30 so that the first extension portion 42A, the curved portion 42C, and the second extension portion 42B are disposed upward of the bracket 30, for example. A tip end of the second extension portion 42B is loosely engaged into the elongated hole 47 in a direction that is substantially orthogonal to that of the fixing portion 43 (at least a width in the vertical direction in the figure of the elongated hole is formed to be greater than a thickness of the second extension portion 42B), and is configured to be extended so as to be slightly protrusive to the front side from the elongated hole 47.

In addition, the second extension portion 4213 constitutes a substantial spring portion for accumulating a spring force by means of the curved portion 42C so that a biasing force acts on a tip end of the second extension portion 42B (a tip end of the spring portion 42) in a direction spaced from the first extension portion 42A. Thus, a curved state in the curved portion 42C is established in a deformed manner, thereby enabling the biasing force to be set at a predetermined value. From the foregoing fact, of course, the curved shape in the curved portion 42C is not always limitative to the shape as illustrated.

By configuring the bearing holder 40 in this manner, the tip end of the upper support shaft 22 of the lamp unit 10, the shaft being inserted into the ball bearing 41, is positioned in the elongated hole 47 of the fixing portion 43, and the tip end of the spring portion 42 is abutted against the tip end of the upper support shaft 22, enabling the upper support shaft 22 to be compressed in an axial direction of the shaft. In addition, the second extension portion 42B of the spring portion 42, as described above, is configured to be loosely engaged into the elongated hole 47 in a direction that is substantially orthogonal to that of the fixing portion 43, so that the upper support shaft 22 to be positioned and disposed in a plane that includes the fixing portion 43 can be compressed along the axial direction of the shaft. In this manner, a distance between a compression point (a load point) of the upper support shaft 22 due to the spring portion 42 of the bearing holder 40 and the fixing portion 43 associated with the bracket 30 of the bearing holder 40 can be set to substantially zero. Thus, such an advantageous effect can be attained that no moment takes place in the spring portion 42, an occurrence of damage to the bracket 30 can be prevented, and a rigidly reliable bearing holder 40 can be obtained.

FIG. 5 (a) and FIG. 5 (b) are sectional views which is taken along the face including the upper support shaft 22 and the lower support shaft 23. FIG. 5(a) and FIG. 5(b) show two states in leveling operation of the lamp unit 10, wherein FIG. 5(a) shows a case in which a centerline that is drawn to connect the upper support shaft 22 and the lower support shaft 23 to each other is oriented in a perpendicular direction, and FIG. 5(b) shows a case in which the centerline that is drawn to connect the upper support shaft 22 and the lower support shaft 23 to each other is slightly inclined with respect to the perpendicular direction. As is evident from FIG. 5(a) and FIG. 5(b), the lamp unit 10 is configured to turn in a vertical direction around the ball baring 41 adapted to pivotably support the upper support shaft 22 by movement of the mechanism housing portion (actuator) 53 in, for example, a backward direction.

A tip end of the upper support shaft 22 of the lamp unit 10, as described above, is formed as a spherical face of which a radius R from a center O of the ball bearing 41 is defined as a curvature. In this manner, in the leveling operation of the lamp unit 10, as described above, even if the upper support shaft 22 of the lamp unit 10 is swung around the ball bearing 41, the second extension portion 42B of the spring portion 42 that is adapted to compress the tip end of the upper support shaft 22 can be configured so as not to shift in a vertical direction. FIG. 1 (a) and FIG. 1(b) are sectional views each showing the bearing holder 40 and its proximity, the bearing holder being fixed to the bracket 30. FIG. 1 (a) shows a proximal part of the bearing holder 40 that is established when the lamp unit 10 is in the state shown in FIG. 5 (a), and FIG. 1 (b) shows a proximal part of the bearing holder 40 that is established when the lamp unit 10 is in the state shown in FIG. 5 (b).

As is evident from FIG. 1 (a) and FIG. 1 (b), the tip end, which abuts against the spring portion 42, of the upper support shaft 22 is formed as a spherical face of which the radius R from the center O of the ball bearing 41 is defined as a curvature; and therefore, in either case of FIG. 1 (a) and FIG. 1 (b) as well, the spring portion 42 (the second extension portion 42B in particular) is not shifted from its original position. Thus, it becomes possible to significantly restrain an occurrence of distortion in compression in a axial direction of the upper support shaft 22, the compression being exerted by the spring portion 42, and in turn, it also becomes possible to substantially stabilize a load on the actuator main body 53 (the sliding edge part 54A of the bracket fixing portion 51) of a sliding piece portion 54A of the slider 54 that is inserted to be engaged with the lower support shaft 23 of the lamp unit 10. In other words, it becomes possible to smoothen sliding between the slider 54 that is provided on the lower support shaft 22 of the lamp unit 10 and the fixing portion with respect to the bracket 30, enabling leveling operation of the lamp unit 10 to be reliable.

Figure 6A:
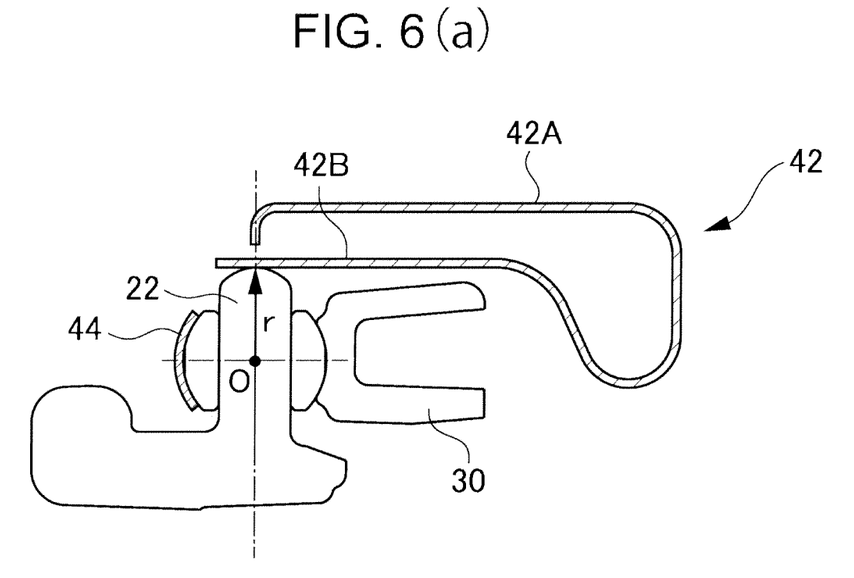
Figure 6B:
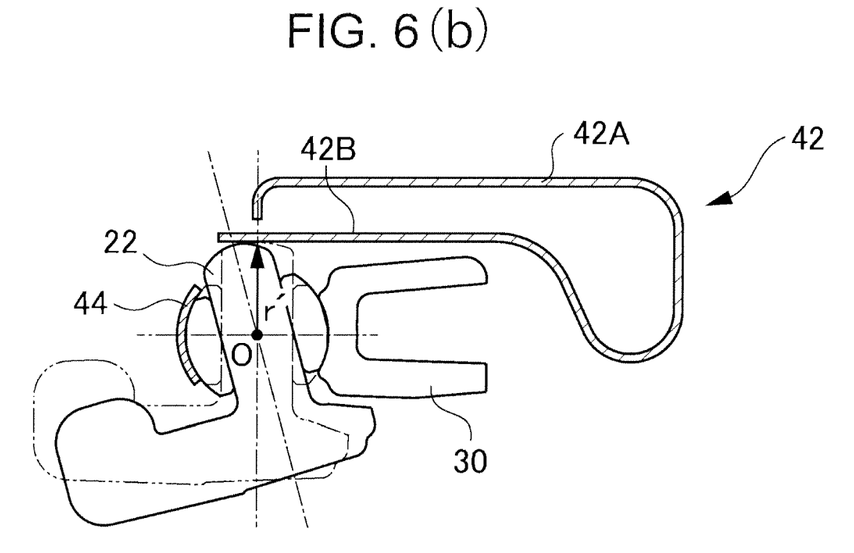

Namely, FIG. 6 (a) and FIG. 6 (b) are views each showing a conventional case in which the tip end of the upper support shaft 22 is configured as a semispherical face having a radius that is substantially identical to that of the upper support shaft 22, wherein FIG. 6 (a) is a schematic view which corresponds to FIG. 1 (a), and FIG. 6 (b) is a schematic view which corresponds to FIG. 1 (b). In such a case, in leveling operation of the lamp unit 10, a distance from the center O of the ball bearing to an abutment surface of the tip end of the upper shaft 22, that abuts against the spring portion 42 (which is designated by r in the case of FIG. 6 (a) and r' in the case of FIG. 6 (b) changes (r≠r'), thereby causing the spring portion 42 to change vertically. This generates a distortion in compression in the axial direction of the upper support shaft 22, the compression being exerted by the spring portion 42, and prevents smooth sliding at a sliding portion between the slider 54 and the fixing portion with respect to the bracket 30.

(Second Embodiment)

The bearing holder 40 that is shown in the first embodiment is configured integrally with the fixing portion 43 for the bracket 30, the bearing holding portion 44 of the ball bearing 41, and the spring portion 42. However, without being limitative thereto, there may be a case in which the spring portion 42 is comprised of a member other than the bearing holder 40, and the spring portion 42 and the bearing holder 40 are mounted on the bracket 30, respectively independently.

In addition, the bearing holder 40 that is shown in the first embodiment is configured to set to substantially zero a distance between a compression point (a load point) of the upper support shaft 22, the compression being exerted by the spring portion 42, and the fixing portion 43 for the bracket 30, of the bearing holder 40, so as to disable a moment to take place at the spring portion 42 thereby preventing an occurrence of damage to the bracket 30. However, with being limitative thereto, there may be a configuration such that the compression point (the load point) of the upper support shaft 22, the compression being exerted by the spring portion 42, and the fixing portion 43 are spaced from each other. This is because that the bearing holder thus configured is also capable of achieving an advantageous effect of the present invention.

(Third Embodiment)

The first embodiment above has described that the actuator main body 50, as shown in FIG. 3, is comprised of the bracket fixing portion 51 and the mechanism housing portion (actuator) 53. However, there may be a case in which the bracket fixing portion 51 is formed after fixed to the support board portion 33 of the bracket 30, for example, and is configured so as to be included in the range of the bracket 30. From the foregoing descriptive matter, a member approximate to the bracket fixing portion 51 that is provided with a sliding portion adapted to slide with the slider 54 may be occasionally referred to as a fixing portion of a bracket in the present specification.

Although the present invention has been described hereinabove by way of embodiment, of course, a technical scope of the present invention is not limitative to the scope of the foregoing embodiments. It would have been self-evident to one skilled in the art that various modifications or alterations can occur to the embodiments. In addition, it is also evident from the scope of the claims that modes including such modifications or alterations can also be encompassed in the technical scope of the present invention.

What is claimed is:

1. A vehicle headlamp comprising:
   a lamp unit that incorporates a light source and includes an upper support shaft and a lower support shaft that are coaxially formed with each other;
   a bracket adapted to support the lamp unit via a ball bearing in the upper support shaft and via a slider in the lower shaft support;
   an actuator including a mechanism portion configured to drive the lower support shaft of the lamp unit, the actuator being movable in a forward direction and a backward direction with respect to the bracket; and
   a spring portion that is fixed to the bracket, and is configured to compress a tip end of the upper support shaft, wherein:
   the actuator is configured to turn the lamp unit in a vertical direction around the ball bearing by being movable in the forward direction and in the backward direction, so that the slider slides with respect to a fixing portion of the bracket at a same time;

a sliding portion between the slider and the fixing portion of the bracket is configured as an arc-shaped face having a curvature defined by a radius around the ball bearing; and the tip end to be compressed by the spring portion is configured as a cylindrical base portion and a spherical face portion atop the cylindrical base portion, the spherical face portion having a width less than or equal to a width of the cylindrical base portion and a radius of curvature defined by a radius around a center of the ball bearing.

2. The vehicle headlamp according to claim 1, wherein:
the ball bearing is supported with the bracket by a bearing holder, and the bearing holder is configured integrally with the spring portion.

3. A vehicle headlamp comprising:
a lamp unit that incorporates a light source and includes an upper support shaft and a lower support shaft that are coaxially formed with each other;

a bracket adapted to support the lamp unit via a ball bearing in the upper support shaft and via a slider in the lower shaft support;

an actuator including a mechanism portion configured to drive the lower support shaft of the lamp unit, the actuator being movable in a forward direction and a backward direction with respect to the bracket; and a spring portion that is fixed to the bracket, and is configured to compress a tip end of the upper support shaft, wherein:

the actuator is configured to turn the lamp unit in a vertical direction around the ball bearing by being movable in the forward direction and in the backward direction, so that the slider slides with respect to a fixing portion of the bracket at a same time;

a sliding portion between the slider and the fixing portion of the bracket is configured as an arc-shaped face having a curvature defined by a radius around the ball bearing; and the tip end to be compressed by the spring portion is configured as a cylindrical base portion and a spherical face portion atop the cylindrical base portion, the spherical face portion having a width less than or equal to a width of the cylindrical base portion and a radius of curvature defined by a radius around a center of the ball bearing, the ball bearing is supported with the bracket by a bearing holder, and the bearing holder is configured integrally with the spring portion, the bearing holder is formed integrally with the fixing portion for the bracket, a bearing holding portion adapted to hold the ball bearing, and the spring portion adapted to compress the tip end of the upper support shaft;

the fixing portion includes the bearing holding portion adapted to hold the ball bearing on a flat plate member while a center of the ball bearing is positioned and held on a same plane as the flat plate member;

the fixing portion is provided with an elongated hole that is adjacent to the bearing holding portion and that extends in a direction crossing the upper support shaft;

the tip end of the upper support shaft to be inserted into the bearing is configured so as to be positioned in the elongated hole;

the spring portion includes a first extension portion that is extended after being bent with respect to the flat plate member from the fixing portion, a curved portion, and a second extension portion that is further extended so as to be loosely engaged into the elongated hole of the fixing portion; and the second extension potion is loosely engaged into the elongated hole in a direction that is substantially orthogonal to a direction of the flat plate member of the fixing portion, and is configured so as to compress the tip end of the upper support shaft.

4. The vehicle headlamp according to claim 3, wherein the bracket comprises a first recessed portion and the bearing holding portion comprises a second recessed portion, the ball bearing being rotatable between the first and second recessed portions.

5. The vehicle headlamp according to claim 3, wherein the first extension portion, the curved portion, and the second extension portion are disposed above the bracket.

* * * * *